Aug. 15, 1967  J. P. MONTGOMERY ET AL  3,335,517
ANIMAL TRAP
Filed May 11, 1965
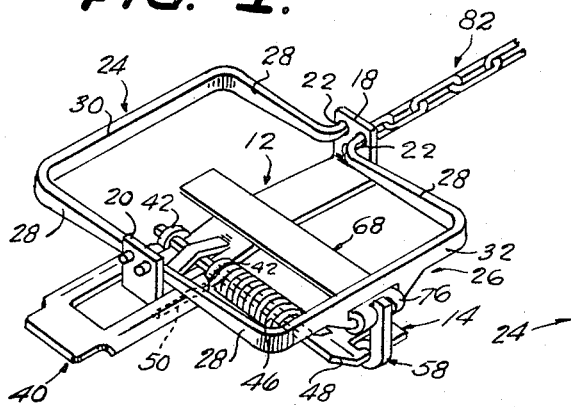
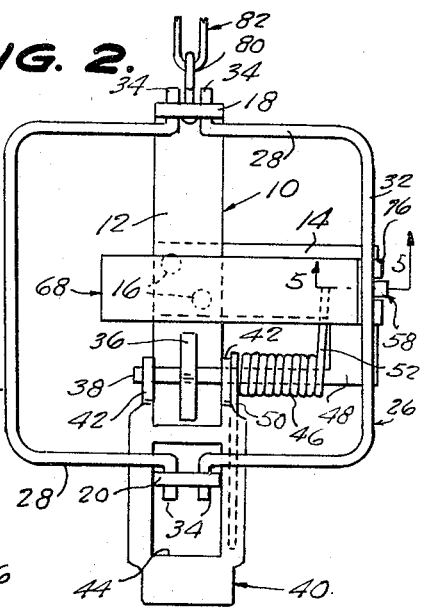
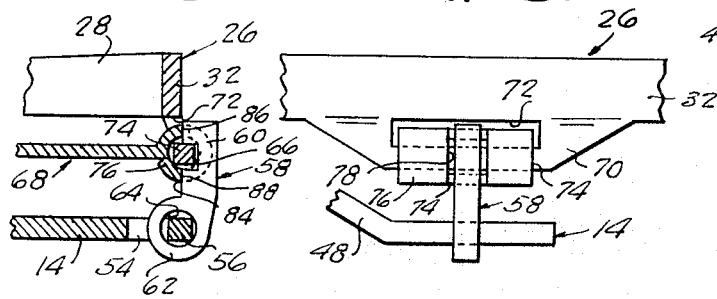
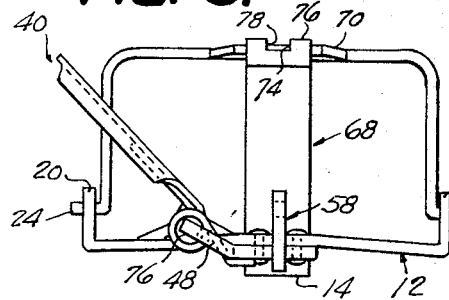
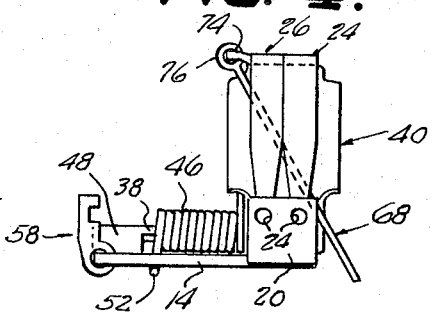
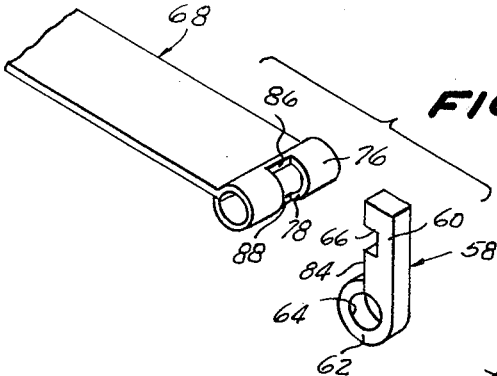
INVENTORS
JAMES P. MONTGOMERY,
HERMAN MONTGOMERY,
BY
Berman, Davidson & Berman
ATTORNEYS.

United States Patent Office 3,335,517
Patented Aug. 15, 1967

3,335,517
ANIMAL TRAP
James P. Montgomery, 5202 Seneca St., Buffalo, N.Y. 14224, and Herman Montgomery, 300 Pine St., Curwensville, Pa. 16833
Filed May 11, 1965, Ser. No. 454,828
7 Claims. (Cl. 43—92)

This invention relates to an animal trap of the spring-pressed jaw, animal weight or pull actuated type.

The primary object of the invention is the provision of a more effective, efficient, and reliable device of the kind indicated, which is adapted to be animal operated, either from the top or the bottom or a side thereof, whereby there is eliminated the possibility that an animal will overturn the trap and trigger the same, without being trapped thereby.

In the drawings:

FIGURE 1 is a top perspective view of a trap of the invention, showing the trap in set or open position;

FIGURE 2 is an enlarged top plan view of FIGURE 1;

FIGURE 3 is an end elevation of the trap showing the same in tripped or closed position;

FIGURE 4 is a side elevation of FIGURE 3;

FIGURE 5 is an enlarged fragmentary sectional view, taken on the line 5—5 of FIGURE 2;

FIGURE 6 is an elevation, taken from the right of FIGURE 5; and

FIGURE 7 is an enlarged and fragmentary exploded perspective view, showing the catch and the trip bar.

Referring in detail to the drawings, the illustrated device comprises a T-shaped base plate 10, having a transversely elongated flat crosshead 12, and a longitudinally elongated standard 14. The inner end of the standard 14 underlies the middle of the crosshead 12 and is fixed thereto, as indicated at 16.

The crosshead 12 is formed with upstanding first and second right-angular ears 18 and 20, on related ends thereof, each of which is provided with a pair of laterally spaced horizontal bores 22 extending therethrough, at the upper ends thereof.

A pair of generally similar first and second U-shaped animal trapping jaws 24 and 26, comprise parallel spaced legs 28, and cross members 30 and 32, respectively. The legs 28 terminate in laterally outwardly directed pintles 34 which are severally journalled through the bores 22 of the related ears 18 and 20. The jaws 24, 26 are arranged to be registered with and engaged with each other, in the tripped positions thereof, as shown in FIGURE 4.

Adjacent to one end of the crosshead 12, the same is punched out to provide an upset strap 36, which, with the upper surface of the crosshead, provides a journal, through which is journalled the inner end of a shaft 38, which extends to opposite sides of the crosshead.

A flat transversely elongated setting lever 40 is formed with spaced apertured lugs 42, on its inner end, through which the shaft 38 is journalled, with the legs 42 bearing against opposite sides of the crosshead 12. The lever 40 is formed with a centered longitudinally extending rectangular slot 44, of a width to receive and pass the second ear 20 on the crosshead 12, and of a length to extend inwardly and outwardly, relative to the ear 20, in the set position of the trap, as shown in FIGURE 2. In the set position of the trap, an intermediate part of the lever 40 bears upwardly against the lower edges of the legs 28 of both of the jaws 24 and 26.

A coil spring 46 is circumposed on the shaft 38, between the lug 42, of the setting lever 40, adjacent to the second jaw 26, and the related jaw cross member 32. The shaft 38 is a part of and extends longitudinally inwardly from a lateral, upwardly angled arm 48, at the outer end of the standard 14. The spring 46 has a first lateral arm 50 engaged beneath the setting lever 40, and a second lateral arm 52 which bears upwardly against the underside of the standard 14.

As shown in FIGURES 1, 5 and 6, the standard 14 is spaced below the level of the second jaw 26, in the set position of the trap, and is formed at its outer end, with a closed transversely extending slot 54, so as to define a transverse pivot bar 56, at the outer end of the standard, of rectangular cross section.

A pawl 58 has a straight, elongated upper portion 60, on whose lower end is an inwardly offset portion 62, formed with a circular opening 64, which freely receives the pivot bar 56. The upper portion 60 of the pawl 58 is formed in its inner edge, with a rectangular notch 66.

A flat elongated trip bar 68 extends inwardly from the cross member 32 of the second jaw 26, and overlies the crosshead 12, in the set position of the trap, as shown in FIGURES 1 and 2. The second jaw cross member 32 is formed intermediate its ends, with a downwardly extending extension 70, which is formed with a horizontally elongated closed slot 72, which defines therebelow, a transverse, rectangular cross section, detent bar 74.

At its outer end, the trip bar 68 is formed with a tubular barrel 76, which is journalled on the detent bar 74 and works through the slot 72, whereby the trip bar is pivotally connected to the cross member 32 of the second jaw 26. The outer side of the barrel 76 is cut away, as indicated at 78, to pass the upper part of the pawl 58, so that the pawl notch 66 can retainably embrace the detent bar 74, in the set position of the trap, as shown in FIGURE 5.

On the outer side of the first crosshead ear 18, is an eye 80, to which a chain 82 can be secured.

The trap is adapted to be set by depressing the setting lever 40, so that the jaws fall to their horizontal open positions, and so that the spring 46 is tensioned, and the trip bar 68 falls upon the cross-head 12. The pawl 58 is then positioned so that its notch 66 engages over the detent bar 74. Both the detent bar 74 and the pawl notch 66 being conformably rectangular in cross section, this engagement of the pawl notch with the detent bar 74, and the engagement of the inner edge 84 of the upper part of the pawl 58, with the upper and lower edges 86 and 88, respectively, of the opening 78 of the barrel 76, causes the trip bar 68 to occupy a generally horizontal position, in which it is spaced upwardly relative to the crosshead 12. With this arrangement, application of pressure, by an animal, on either the upper or lower surfaces of the trip bar 68, causes a related edge of the barrel opening 78 to push against the inner edge 84 of the upper part of the pawl 58 and thereby disengage the pawl from the detent bar 74 and the barrel 76, so as to free the spring 46 to move both the setting lever 40 and the trip bar 68 upwardly. As the setting bar 40 is moved upwardly, the parts thereof, at opposite sides of its slot 44, push upwardly on the adjacent legs 28 of the jaws and close the jaws toward each other, so as to clamp the jaws upon such as the leg of an animal bearing upon the trip bar 68.

What is claimed is:

1. An animal trap comprising a base plate, opposed first and second jaws journalled on the base plate, a setting lever pivoted on the base plate and engaged with one side of each jaw, a spring tensioned between the setting lever and the base plate for driving the jaws toward each other, a trip bar pivoted on one of the jaws, said one jaw having a first pivot bar on which the trip bar is freely journalled, a pawl pivoted on the base plate, said pawl being formed with a notch adapted to receive said first pivot bar for retaining the pawl effectively engaged with said first pivot bar against the tension of the spring and means on said trip bar for releasing said pawl from said first pivot bar.

2. An animal trap comprising a base, a pair of opposed jaws pivoted on the base, one of said jaws having a polygonal detent bar thereon, a pawl pivoted on the base, said pawl having an inner edge formed with a polygonal notch adapted to conformably receive said polygonal detent bar, in the set position of the trap, a trip bar pivoted on said one of said jaws, said trip bar having opposed abutment portions operatively engageable with the inner edge of the pawl at opposite sides of the pawl notch for disengaging the pawl from the detent bar, a setting lever pivoted on the base and engaged with portions of both of the jaws, and spring means acting between the setting lever and said base, the setting lever being adapted to be pivoted in one direction to tension the spring means.

3. An animal trap according to claim 2, wherein said trip bar overlies and is normally spaced from a side of the base, the trip bar being movable in opposite directions for disengaging the pawl from the detent bar.

4. An animal trap comprising a T-shaped base having a crosshead and a standard, said crosshead having longitudinally spaced lateral first and second ears thereon, first and second U-shaped opposed jaws having legs and cross members, said legs terminating in lateral pintles journalled on said ears, a trip bar pivoted at its outer end on the cross member of said second jaw, said trip bar extending inwardly from the crosshead of the base and overlying the standard of the base, a pawl pivoted on the outer end of the standard, a transverse polygonal cross section detent bar on the cross member of the second jaw, said pawl having an inner edge formed with a polygonal notch adapted to non-rotatably receive the detent bar for maintaining the jaws in a set position spaced from the base, the outer end of the trip bar having opposed abutments adapted to engage the inner edge of the pawl at opposite sides of said notch for maintaining the trip bar spaced from the base, a setting lever pivoted on said crosshead and engaged with legs of the jaws, and spring means acting between the setting lever and the standard of the base.

5. An animal trap according to claim 4, wherein the outer end of the trip bar has a barrel journalled on said detent bar, the outer side of the barrel being formed with an opening the ends of which define said opposed abutments, the pawl being normally engaged through said opening with its notch engaged with the detent bar.

6. An animal trap according to claim 4, wherein said setting lever is pivoted on the crosshead inwardly of the legs at one side of the jaws and extends outwardly therefrom, said setting lever being formed with a slot adapted to pass at the first ear on the crosshead.

7. An animal trap according to claim 4, wherein said setting lever is pivoted on the crosshead inwardly of the legs at one side of the jaws and extends outwardly therefrom, said setting lever being formed with a slot adapted to pass at the first ear on the crosshead, said standard of the base having a lateral extension adjacent to the cross member of the second jaw, said extension having a shaft extending inwardly therefrom, on which the setting lever is pivoted, said spring comprising a coil spring circumposed on said shaft and having a first lateral arm engaged with a side of the setting lever and a second lateral arm engaged with a side of the standard of the base.

References Cited
UNITED STATES PATENTS

| | | | |
|---|---|---|---|
| 351,807 | 11/1886 | Skinner | 43—92 |
| 351,808 | 11/1886 | Skinner | 43—92 |
| 1,890,377 | 12/1932 | Gibbs | 43—88 |
| 1,893,974 | 1/1933 | Zook | 43—88 |
| 1,961,075 | 5/1934 | McMullen | 43—88 |
| 2,947,107 | 8/1960 | Lehn | 43—92 |

SAMUEL KOREN, *Primary Examiner.*

W. H. CAMP, *Assistant Examiner.*